United States Patent [19]

Grosseau

[11] 3,736,002
[45] May 29, 1973

[54] AXLE WITH INDEPENDENT WHEELS

[75] Inventor: Albert Grosseau, 92 Chaville, France

[73] Assignee: Societe Anonyme Automobiles Citroen, Paris, France

[22] Filed: Feb. 16, 1971

[21] Appl. No.: 115,403

[30] Foreign Application Priority Data

Feb. 18, 1970 France .......................... 7005877

[52] U.S. Cl. ............ 280/124 F, 267/15 A, 267/21 A
[51] Int. Cl. ............................................. B60g 11/64
[58] Field of Search ................ 267/15 A, 20 A, 21 A; 280/124 F

[56] References Cited

FOREIGN PATENTS OR APPLICATIONS 745,508    11/1966    Canada............................. 267/21 A
1,476,570   3/1967    France.............................. 267/15 A Primary Examiner—Philip Goodman
Attorney—Arnold Robinson

[57] ABSTRACT

An axle wherein the independent wheel carriers each rock around a transverse longitudinal member adapted to rock inside a corresponding dished support; each pair of parallel dished supports being interconnected by a hollow cross-beam and connected to the chassis through elastic means, a hydroelastic shock-absorbing suspension enclosed at each end of the cross-beam and bearing against the latter to control the rocking of the corresponding wheel carrier around the transverse axis through the agency of a lever rocking in unison with the wheel carrier around the same axis between predetermined limits.

9 Claims, 5 Drawing Figures

Patented May 29, 1973

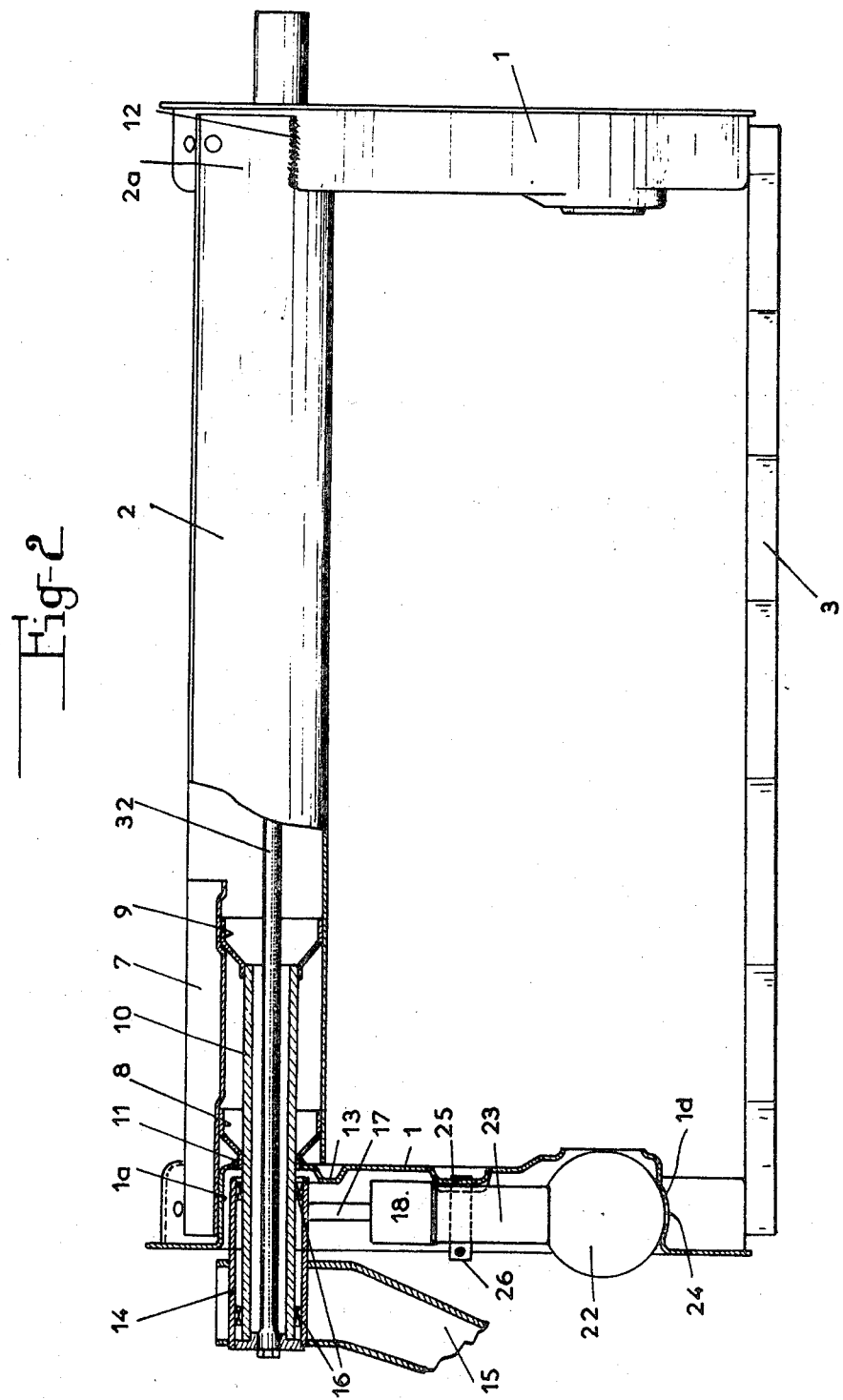

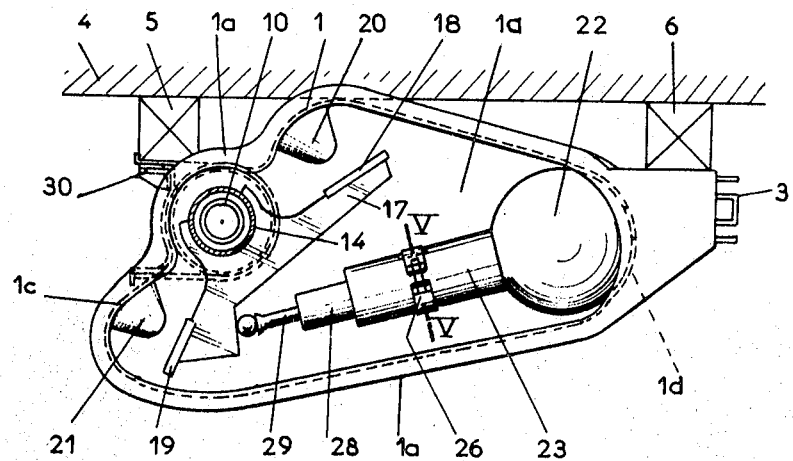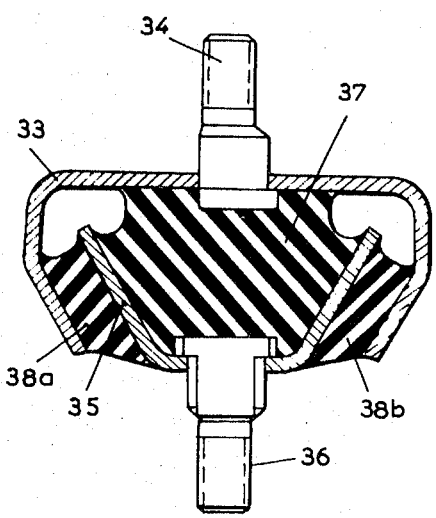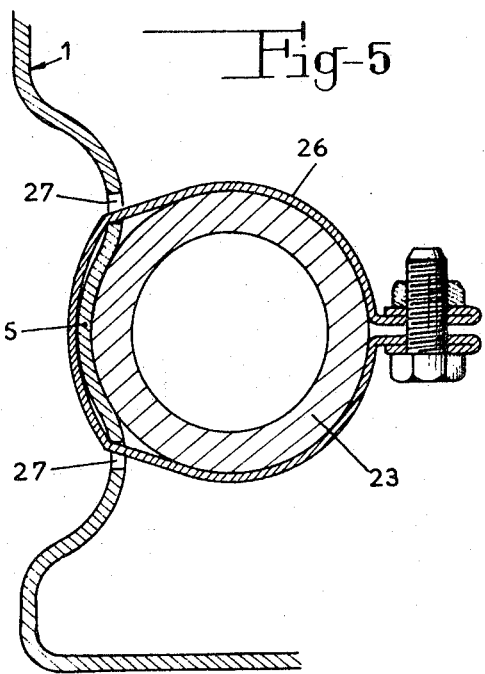

AXLE WITH INDEPENDENT WHEELS

The present invention has for its object an axle for independent wheels provided with longitudinal suspension arms and with means allowing transverse oscillation, which axle is associated with a hydroelastic suspension. More specifically the invention relates to an axle of such a type which exerts no substantial local stress on the chassis and effectively dampens the noise and vibrations produced by the running of the vehicle.

A principal feature of this improved axle comprises two dished supports for the suspension, said supports being interconnected by at least one cross-beam and being connected with the chassis through elastic carrier members, while each of said supports is provided with transverse axis around which the wheel-carrying arm can rock, and encloses a hydroelastic shock-absorbing suspension connected with the corresponding wheel-carrying arm and bearing against the support considered.

In an advantageous embodiment of the invention, a lever rigid with a wheel-carrying arm and subjected to the action of the hydroelastic suspension is pivotally secured round the transverse oscillatory axis and carries abutment shoes adapted to cooperate with stops limiting its forward and rearward motion.

The cross-beam may be constituted by a completely closed hollow body such as a tube or else by a hollow body closed only at one end and the transverse member acting as an oscillatory axis for each support engages said cross-beam over a part of its length.

There is described hereinafter by way of example and in a non-binding sense a preferred embodiment of the invention, reference being made to the accompanying drawings wherein:

FIG. 2 is a plan view thereof, in part in section.

FIG. 3 is an end view of the axle.

FIG. 4 is a cross-sectional view of an elastic carrier arrangement.

FIG. 5 is a cross-sectional view of a detail taken along line V-V of FIG. 3.

Figure 1:
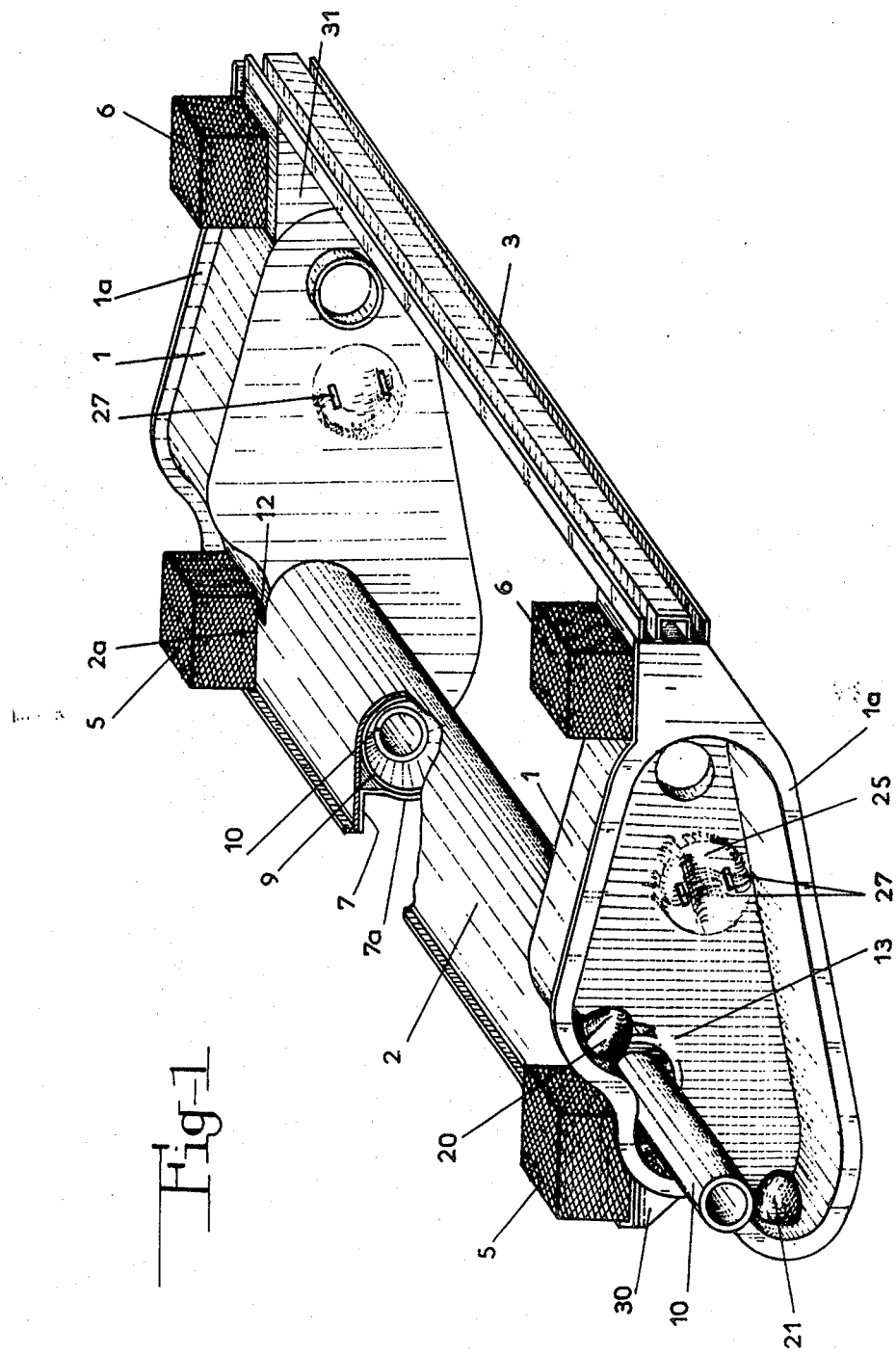
FIG. 1 is a perspective view of an axle in accordance with the hydroelastic suspension means above referred to, not being illustrated.

As illustrated, the axle comprises two supports 1 forming part of its suspension and which are interconnected by the cross-beam 2 in the form of a hollow body, and optionally by an auxiliary cross-beam 3. The whole arrangement is connected with the chassis 4 (FIG. 3), by elastic carrier members, shown respectively at 5 to the front and at 6 to the rear.

Each of the supports 1 comprises an outwardly facing dished portion of pressed steel and provided with an outer peripheral flange 1a. The cross-beam 2 is in the shape of a forwardly open U-shaped or Ω-shaped part, the open side of which is closed by reinforcing struts 7. Annular supports 8 and 9 carrying the axle tube 10 extend through each dished support 1 and are welded along their outer peripheries to the cross-beam 2 inside which they are fitted. Said annular supports 8 and 9 are funnel-shaped and concentric with the cylindrical rear portion of said enclosing cross-beam 2, while the reinforcing struts 7 each include a convex portion 7a engaging the annular supports 8 and 9 and welded thereto. The annular supports 8 are welded endwise to the corresponding dished supports 1 along their inner peripheries by means of welded beads 11. Furthermore each end of the cross-beam 2 extends along one of its sides so as to form a substantially horizontal web 2a secured to the side of the corresponding dished support 1 by means of a welded bead 12.

The bottom area of each dished support 1 surrounding the axle tube 10 is provided with an arcuate reinforcing rib 13, the gap between the ends of which is closed by a bulging section of the flange 1a of the dished support. A hub 14 rigid with a wheel-carrying suspension are 15 is revolvably carried by the axle tube 10 on roller bearings 16. The hub 14 is also rigid with a lever 17, the opposite ends of which carry shoes 18 and 19 (FIG. 3) adapted to engage stationary stops 20 and 21 of elastic material to limit the angular shift of the hub 14, said stops being secured to concave areas 1b and 1c of the dished support 1.

An inflatable suspension sphere 22 engages a further concave area 1d in the outer surface of the dished support 1 and separates in a conventional manner an outer chamber filled with compressed gas from an inner liquid-filled chamber communicating with a cylinder 23. The area 1d engaged by the sphere is provided (FIG. 2) with an opening 24 affording a passage for the connection adapted to inflate the sphere. The cylinder 23 of the suspension is held fast outside an area 25 stamped out of the bottom of the corresponding dished support 1 and it is held thereon by a safety collar 26 extending through slots 27 beyond said area 25 (FIG. 5). A piston 28 is slidingly carried within the cylinder 23 and the end of the rod 29 engages lever 17.

The front carrier members 5 are secured to the cross-beam 2 at points locally reinforced by angle irons 30. Rear carrier members 6 are secured to bearings 31 welded to the rear of dished supports 1 and forming therewith rectangular parallelopipeds open solely through their lower ends. The two hubs 14 may be interconnected by a bar 32 to oppose rolling motion.

From the preceding disclosure, it is apparent that all the stresses applied to each dished support lie in a common plane perpendicular to the axis of the corresponding axle tube 10. The force exerted by the inflatable sphere 22 on the lever 17 and the reaction of the dished support 1 are both absorbed by the latter and are not transmitted to the chassis 14. The two elastic carrier members 5 and 6 located on the same side of the vehicle register with the transverse plane passing through the corresponding lever 17, that is the plane containing the stresses produced in the suspension.

FIG. 4 illustrates a modification of the elastic carrier member, which may serve both as a front and a rear carrier member, said modified carrier member being less rigid in a direction parallel with the longitudinal axis of the vehicle than in a transverse and in a vertical direction. This carrier member includes an outer element 33 having a U-shaped cross-section, the lateral edges of which converge and which may be secured by threaded rod 34 carried by it to the cross-beam 2 or to bearing 31, while the inner element 35, also having a U-shaped cross-section is provided with divergent lateral edges and is housed within the outer element 33, but faces a direction opposed to that faced by the latter, whereby its lateral edges are parallel with those of said element 33; said element 35 may be secured to that chassis 4 through the threaded rod 36 rigid with it. Elastic pads or buffers 37, 38a and 38b are fitted between the main central parts of the elements 33 and 35 and between their cooperating lateral edges.

Under the action of a longitudinal force, the elastic buffers 37, 38a and 38b are subjected to shearing stresses whereas in the case of a vertically or transversely acting force, they are subjected to both shearing and compressional stresses so that, for a force of a predetermined value, the shifting is reduced.

Obviously, the invention is not limited to the embodiments described and it covers, in contradistinction, all the modifications thereof falling within the scope of the accompanying claims.

What is claimed is:

1. A vehicle axle for carrying at least one independently mounted wheel on at least one longitudinal suspension arm, which comprises:
   a. two dished suspension supports interconnected by at least one cross-beam member;
   b. elastic carrier means for securing the support members to a vehicle chassis;
   c. a transverse member mounted in each of the dished suspension supports;
   d. means for pivotally mounting the at least one longitudinal suspension arm on the transverse member so that the at least one longitudinal suspension arm is adapted to pivot about a transverse axis;
   e. hydroelastic suspension means acting as a shock absorber and mounted in the dished suspension supports for damping the pivotal motion of the at least one longitudinal suspension arm; and
   f. means adapted to pivot with the at least one longitudinal suspension arm for engaging the hydroelastic suspension means.

2. A vehicle axle as claimed in claim 1 wherein the means for engaging the hydroelastic suspension means comprises a lever rigid with the suspension arm, the lever pivoting round the transverse member and carrying at its opposite ends abutment shoes adapted to engage stops at the corresponding ends of the path over which the lever is allowed to travel under the action of the hydroelastic suspension means.

3. A vehicle axle as claimed in claim 1, wherein the cross-beam is hollow and encloses a part of the lengths of the transverse members carried by the dished supports.

4. A vehicle axle as claimed in claim 3 wherein the cross-beam has a U-shaped or $\Omega$-shaped cross-section, the longitudinal opening of said cross-beam being closed at its outer ends by reinforcing struts.

5. A vehicle axle as claimed in claim 4 wherein each transverse member is secured to the cross-beam with the interposition of funnel-shaped annular supports which may be housed coaxially within the substantially cylindrical longitudinal portion of the cross-beam opposed to its opening.

6. A vehicle axle as claimed in claim 5, wherein each reinforcing strut includes an arcuate section engaging the outer surface of the corresponding funnel-shaped annular support to which it is welded.

7. A vehicle axle as claimed in claim 2 further comprising a bar for connecting two longitudinal arms, to oppose rolling motion of the longitudinal arms, the bar being housed within the hollow cross-beam.

8. A vehicle axle as claimed in claim 1 wherein the elastic carrier members are less rigid in a direction parallel with the longitudinal direction of the vehicle than in a transverse or in a vertical direction.

9. A vehicle axle as claimed in claim 1 wherein the dished suspension supports further comprise a concave area against which the hydroelastic suspension means bear.

* * * * *